United States Patent Office 3,544,548
Patented Dec. 1, 1970

3,544,548
WATER-INSOLUBLE MONOAZO DYESTUFFS
Dieter Günther, Kelkheim, Taunus, Ernst Hoyer, Frankfurt am Main, Heinz Schmidt, Kelkheim, Taunus, and Hansjörg Vollmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 2, 1968, Ser. No. 741,910
Claims priority, application Germany, July 18, 1967,
F 52,992
Int. Cl. C09b 29/36; D06p 1/02
U.S. Cl. 260—152
6 Claims

ABSTRACT OF THE DISCLOSURE

Water-insoluble monoazo-dyestuffs of the formula

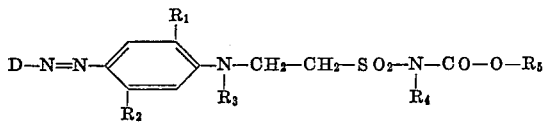

in which D represents phenyl which may be substituted by non-water solubilizing groups, $R_1$ represents hydrogen or lower alkoxy, $R_2$ represents hydrogen, chlorine, bromine, lower alkyl, lower alkoxy, or lower acylamino, $R_3$ and $R_4$ each represent hydrogen or lower alkyl, $R_5$ represents lower alkyl or phenyl, and $R_4$ and $R_5$ together with the radical —N—CO—O— the ring

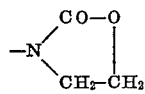

said dyestuffs being suitable for the dyeing of textile materials consisting of cellulose-triaceate, cellulose-2½-acetate, polyamide and polyurethane fibres, particularly of polyester fibres, and of mixtures of wool and polyester fibres.

---

The present invention provides new water-insoluble monoazo dyestuffs corresponding to the general Formula 1

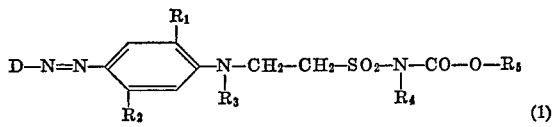
(1)

wherein D represents the radical of a diazo component of the benzene series free from water-solubilizing groups, $R_1$ represents a hydrogen atom or an alkoxy group of 1 to 4 carbon atoms, $R_2$ represents a hydrogen, chlorine or bromine atom or an alkyl group of 1 to 4 carbon atoms, an alkoxy group of 1 to 4 carbon atoms, or an alkanoylamino group of 1 to 4 carbon atoms, $R_3$ and $R_4$ each represent a hydrogen atom or an alkyl group of 1 to 4 carbon atoms, $R_5$ represents an alkyl group of 1 to 4 carbon atoms or a phenyl radical and the radicals $R_4$ and $R_5$ may be linked by formation of an oxazolidinone ring. The invention also provides a process for the manufacture of the above mentioned dyestuffs by diazotizing aromatic amines of the general Formula 2

(2)

wherein D has the meaning given above and by coupling them with coupling components of the general Formula 3

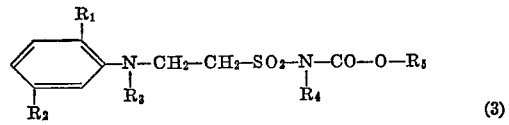
(3)

wherein $R_1$, $R_2$, $R_3$, $R_4$ and $R_5$ have the meanings given above.

The benzene nucleus of the diazo component may be substituted by non-water solubilizing groups, such as nitro, nitrile, trifluoromethyl, alkylsulfonyl, acetyl and/or carboxylic acid ester groups, or by chlorine and/or bromine atoms.

The coupling components corresponding to the said Formula 3 used in the process of the present invention can be obtained for example by reacting alkenylsulfonyl carbamic acid esters with primary or secondary aromatic amines.

As amines, from which the diazo compounds used are made, there may be mentioned for example 4-nitroaniline, 2-chloro-4 - nitroaniline, 2-bromo - 4-nitroaniline, 2-cyano-4-nitroaniline, 2,4 - dinitroaniline, 4-cyano - 2-nitroaliline, 3-nitro-4 - amino-benzotrifluoride, 5 - nitro-2-amino - benzotrofluoride, 5-nitro-2-amino- benzoic acid methyl ester, 2,6-dichloro-4 - nitroaniline, 2,6-dibromo-4-nitroaniline, 6-chloro-2,4-dinitroaniline, 6-bromo - 2-dinitroaniline, 4-amino-acetophenone, [2-amino-5-nitrophenyl]-methyl-sulfone or [3-nitro - 4 - amino - phenyl] - [β-methoxy-ethyl]-sulfone.

Coupling is generally carried out in an acid to neutral medium. The addition of acid binding agents, such as sodium acetate or magnesium carbonate, may be advantageous. The dyestuffs precipitate in insoluble form and are separated for instance by filtration and freed from adhering electrolytes by washing with water.

The new water-insoluble monoazo dyestuffs obtained according to the process of the present invention are worked into dyeing materials as usual with dispersing agents. These dyeing materials produce on synthetic fibres, for example cellulose triacetate fibres, cellulose-2½-acetate fibres, polyamide and polyurethane fibres, especially on polyester fibres as for example polyethylene-terephthalate fibres, along with a very good build-up, dyeings and prints having a high tinctorial strength and very good fastness properties to processing and use, among which those to light and to wetting as well as the thermal fastness properties are oustanding.

For the dyeing of polyester materials, the new dyestuffs are suitably used in the form of the aforementioned dyeing materials in aqueous suspension at temperatures of more than 100° C. under pressure, or at about 100° C. by adding the usual carriers. Full dyeings can be obtained too, when polyester fabrics or textiles are impregnated with suspensions of the new dyestuffs, dried and then exposed to a short action of heat, for example, of about 190° to 210° C. The dyestuffs are furthermore very suited for dyeing mixtures of fibres containing polyester. By dyeing polyester wool mixtures, the woolen part is only weakly coloured, the colour yield on the polyester being very high. The wool dyeing can easily be removed by an aftertreatment with reducing agents or emulsifiers.

In the following examples the parts by weight are to the parts by volume as the kilogram to the litre.

EXAMPLE 1

55.2 parts by weight of 4-nitroaniline are dissolved, while stirring, in 120 parts by volume of water and 120 parts by volume of concentrated hydrochloric acid at 80° to 90° C. The solution obtained is added, in form of a thin stream, to a mixture of 200 parts by weight of ice and 200 parts by volume of water, the temperature should not be over 8° C. Then, 82 parts by volume of 5 N sodium nitrite solution are added quickly, stirring is continued for 10 minutes to destroy the excess nitric acid by means of amidosulfonic acid. Coupling is effected with a solution of 114 parts by weight of 3-[β-(phenyl-N-methylamino)-ethyl-sulfonyl]-oxazolidinone-(2) in 550 parts by volume of glacial acetic acid. Stirring is continued for some hours at 18° to 22° C., followed by filtering off the dyestuff formed and washing with water, until the filtrate is free from electrolytes and flows off, and drying at 60° C. 170 parts by weight of the dyestuff corresponding to the formula

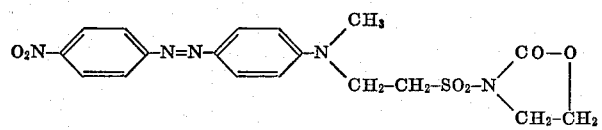

are obtained in form of a scarlet powder. In a finely dispersed form the dyestuff dyes polyester fibres orange shades having very good fastness properties to light and thermofixation.

EXAMPLE 2

By diazotizing 55.2 parts by weight of 4-nitroaniline according to the method described in Example 1 though coupling with a solution of 120 parts by weight of N-[β-(phenylamino)-ethyl-sulfonyl]-N-ethyl-carbamic acid ethyl ester in 400 parts by volume of glacial acetic acid and by proceeding as described in Example 1, the dyestuff corresponding to the formula

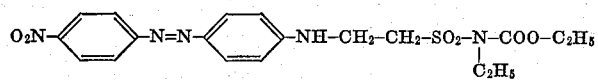

is obtained in form of a scarlet powder. Finely dispersed, this dyestuff produces on polyester fibres a clear reddish yellow shade having a very good fastness to light and thermofixation.

EXAMPLE 3

65 parts by weight of 5-nitro-2-amino-benzonitrile are added to a mixture of 148 parts by weight of sulfuric acid 96% and 130 parts by weight of nitrosylsulfuric acid 40% at 5° to 10° C. and stirred for one hour at the same temperature. The solution is poured onto 2000 parts weight of ice. The excess nitric acid is then destroyed with small amounts of amidosulfonic acid. Coupling is effected with a solution of 127 parts by weight of N-[β-(m-methyl-phenyl-amino)-ethyl-sulfonyl]-N-ethyl - carbamic acid ethyl ester in 900 parts of glacial acetic acid. The whole is then stirred for some hours at 18° to 22° C., the dyestuff that has formed is filtered off with suction, washed with water until the filtrate flows off free from electrolytes, and dried at 60° C. 178 parts by weight of the dyestuff corresponding to the formula

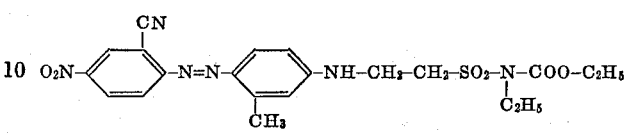

are obtained in form of a red-brown powder. Finely dispersed this dyestuff produces on polyester fibres a red shade having a very good fastness to light and to thermofixation.

EXAMPLE 4

Into a mixture of 148 parts by weight of sulfuric acid 96% and 130 parts by weight of nitrosylsulfuric acid 40%, there are added, while stirring, 69 parts by weight or 2-chloro-4-nitroaniline at 5° to 10° C. Stirring is then continued for one hour at the same temperature. The solution is then poured onto 2000 parts by weight of ice, the excess nitric acid is destroyed with small amounts of amidosulfonic acid, while coupling is effected with a solution of 134 parts by weight of N-[β-(N'-phenyl-N'-methylamino)-ethyl-sulfonyl]-carbamic acid phenyl ester in 1000 parts by volume of glacial acetic acid. Stirring is continued for some hours, the dyestuff that has formed is filtered off with suction, washed with water until the filtrate flows off free from electrolytes, and dried at 60° C. 185 parts by weight of the dyestuff corresponding to the formula

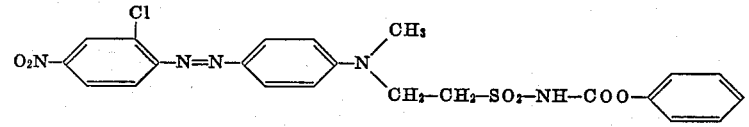

are obtained in form of a red-brown powder. Finely dispersed, this dyestuff produces on polyster fibres red shades having very good thermal fastness properties.

The following table indicates other dyestuffs which can be obtained according to the process of the present invention. The last column indicates the shade produced by these dyestuffs on polyester fabrics.

(1) 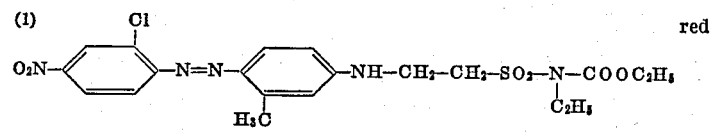 red (2) 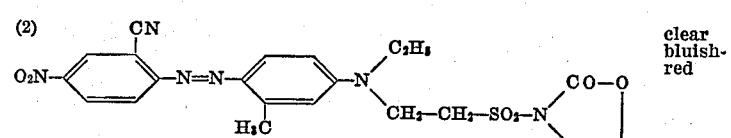 clear bluish-red (3) 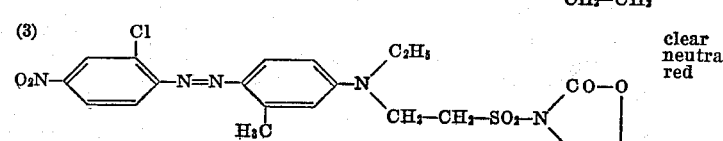 clear neutral red

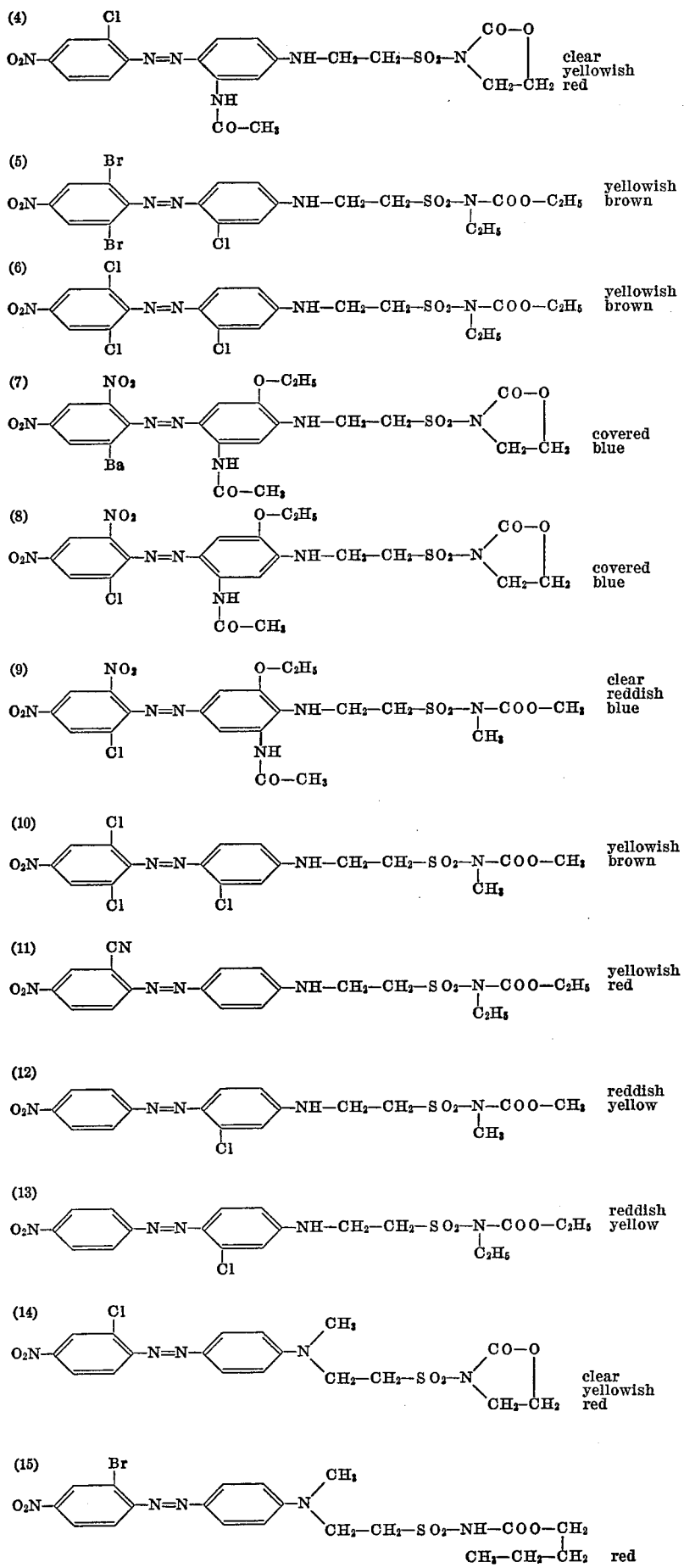

(16) 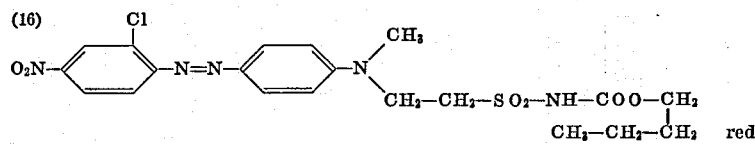 red
(17) 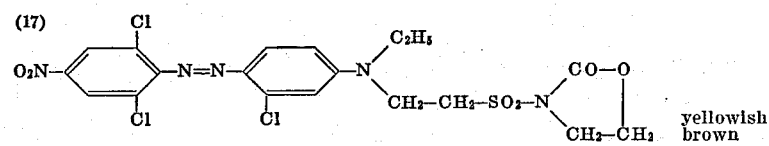 yellowish brown
(18) 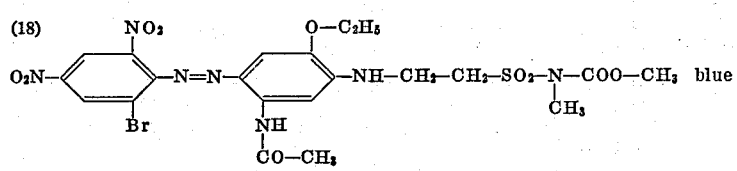 blue
(19) 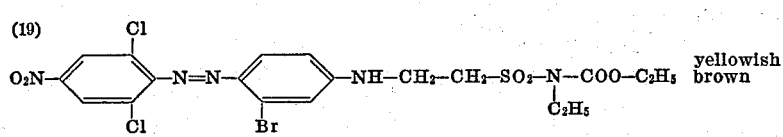 yellowish brown
(20) 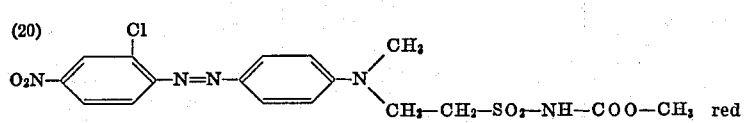 red
(21) 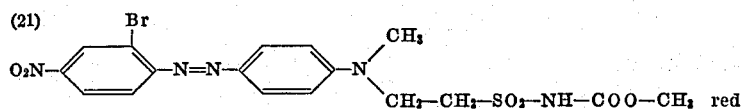 red
(22) 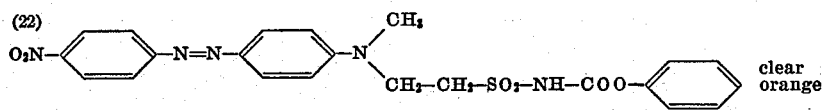 clear orange
(23) 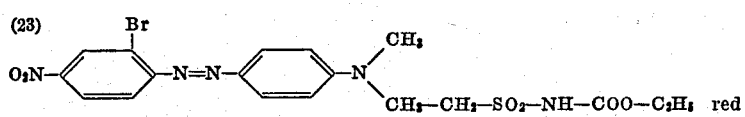 red
(24) 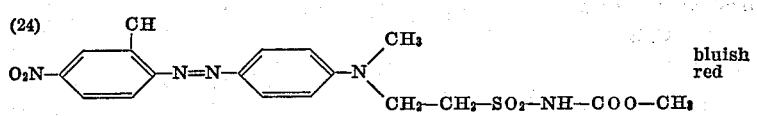 bluish red
(25) 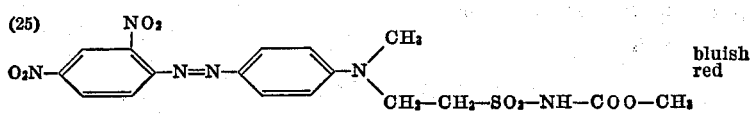 bluish red
(26) 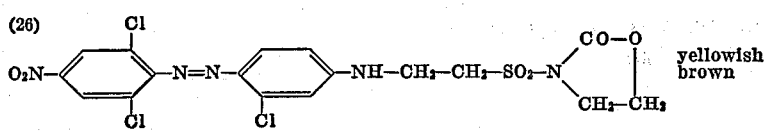 yellowish brown
(27) 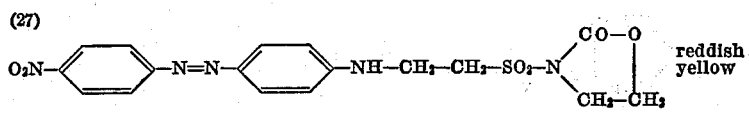 reddish yellow
(28) 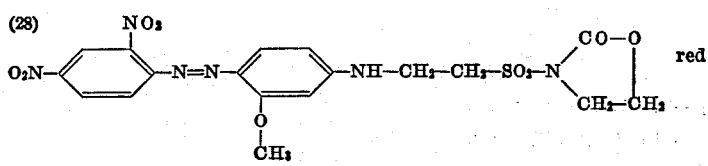 red

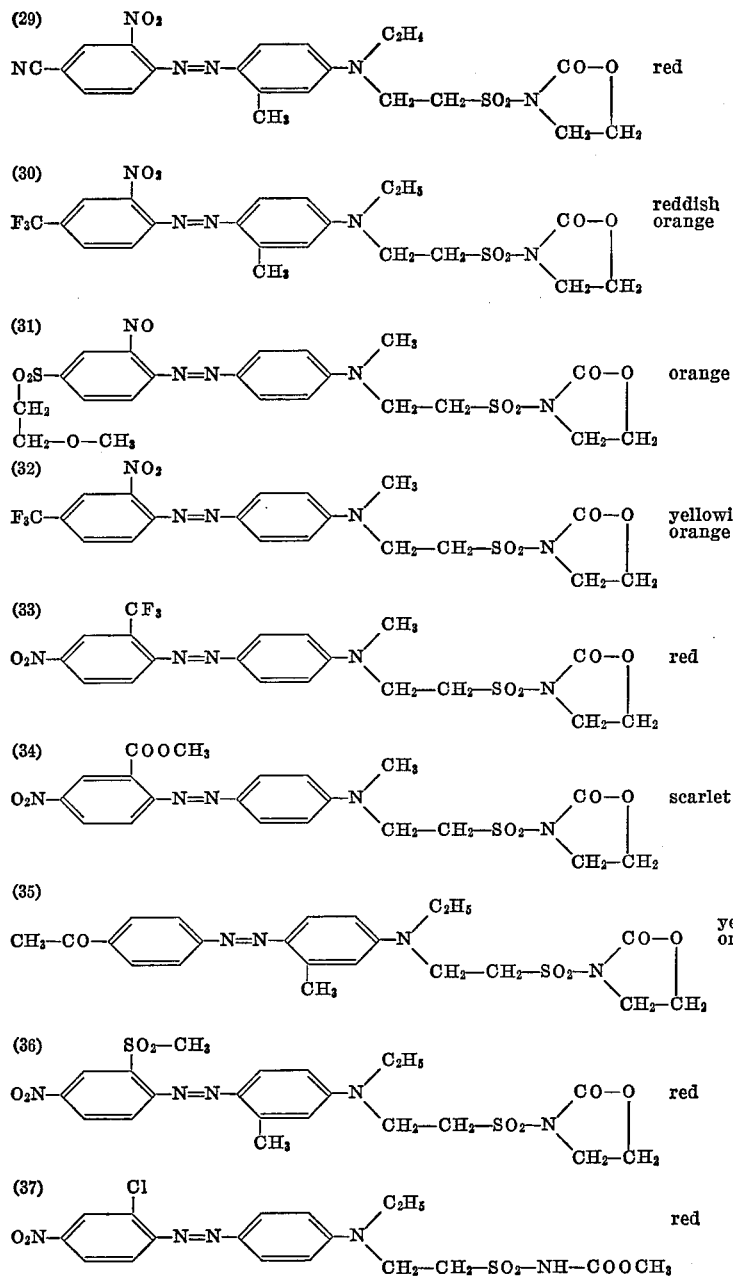

We claim:
1. The water-insoluble monoazo dyestuff of the formula

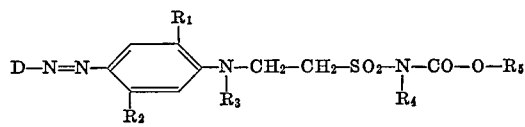

in which D represents nitrophenylene, nitro-cyano-phenylene, nitro-chloro-phenylene, nitro-bromo-phenylene, nitro-dichloro-phenylene, nitro-trifluoromethyl-phenylene, nitro-(β - lower alkoxy - ethylsulfonyl) - phenylene, nitro - carb (lower alkoxy)-phenylene, nitro-methylsulfonyl-phenylene, dinitro-bromo-phenylene, dinitro-chloro-phenylene, or acetyl-phenylene, $R_1$ represents a hydrogen atom or an alkoxy group of 1 to 4 carbon atoms, $R_2$ represents hydrogen, chlorine, bromine or alkyl of 1 to 4 carbon atoms, alkoxy of 1 to 4 carbon atoms or alkanoylamino of 1 to 4 carbon atoms, $R_3$ and $R_4$ each represents hydrogen or alkyl of 1 to 4 carbon atoms, $R_5$ represents alkyl of 1 to 4 carbon atoms or phenyl, and $R_4$ and $R_5$ together with the radical —N—CO—O the ring

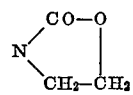

2. The water-insoluble monoazo dyestuff of the formula

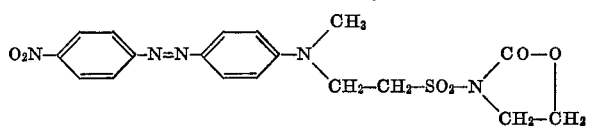

3. The water-insoluble monoazo dyestuff of the formula
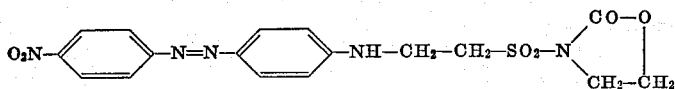
4. The water-insoluble monoazo dyestuff of the formula
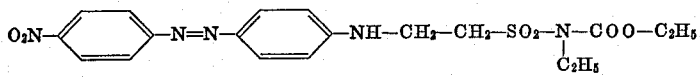
5. The water-insoluble monoazo dyestuff of the formula
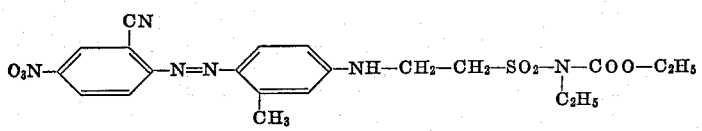
6. The water-insoluble monoazo dyestuff of the formula
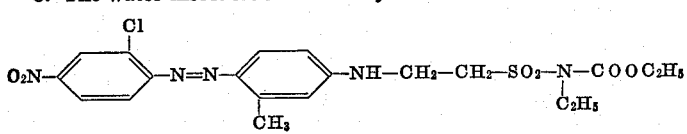
References Cited
UNITED STATES PATENTS
2,873,268   2/1959   Steinemann _____ 260—146
CHARLES B. PARKER, Primary Examiner
D. M. PAPUGA, Assistant Examiner
U.S. Cl. X.R.
260—207, 207.1, 307, 470; 8—41, 55